Nov. 26, 1957　　　　　R. B. HILLS　　　　　2,814,200
AIR FLOW CHECK DEVICE FOR LIQUID FLOW METERS
Filed Dec. 2, 1954　　　　　　　　　　2 Sheets-Sheet 1
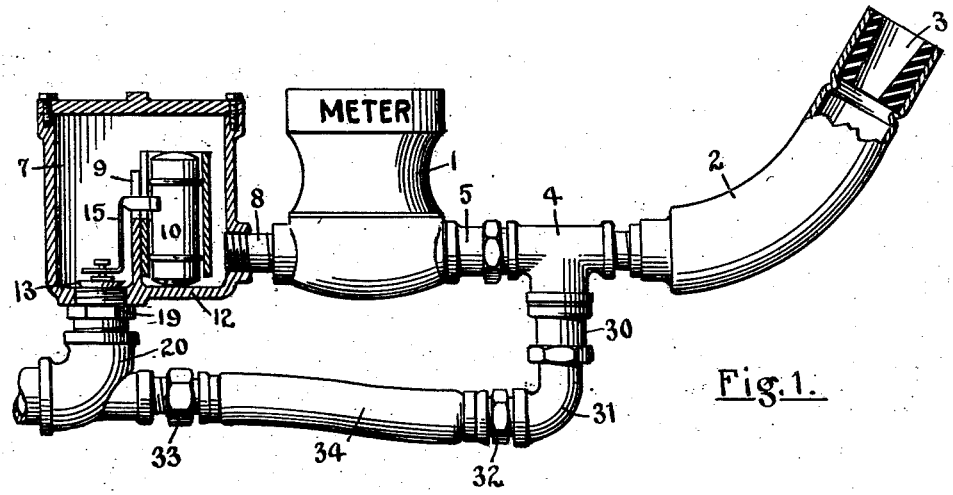
Fig. 1.
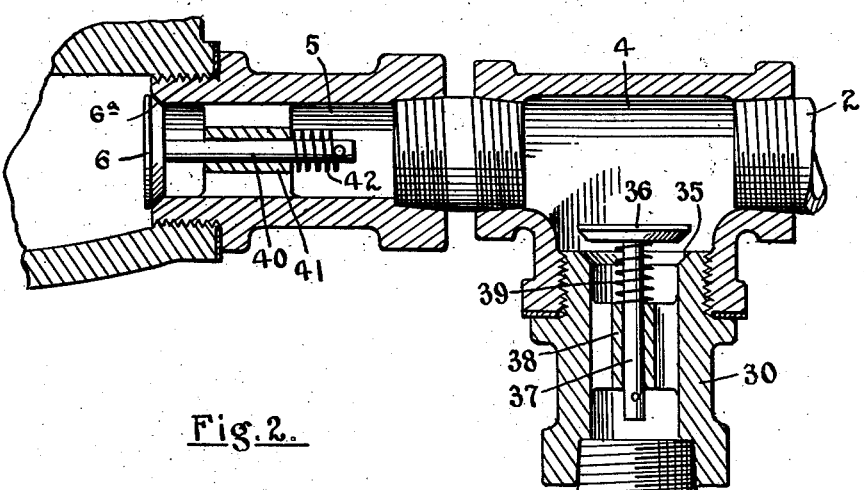
Fig. 2.
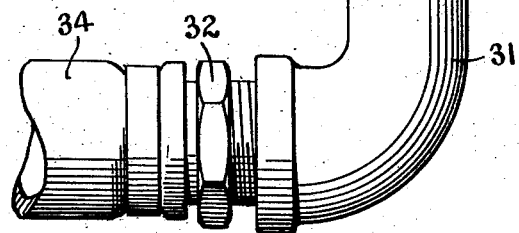
Inventor
Russell B. Hills
By Harold O. Van Antwerp
Attorney Inventor
Russell B. Hills
By Harold O. Van Outiver Jr.
Attorney

United States Patent Office 2,814,200
Patented Nov. 26, 1957

2,814,200

AIR FLOW CHECK DEVICE FOR LIQUID FLOW METERS

Russell B. Hills, Grand Rapids, Mich.

Application December 2, 1954, Serial No. 472,736

9 Claims. (Cl. 73—200)

This invention relates to a device used to prevent erroneous actuation of a liquid flow meter. Although it may find other uses, it is particularly intended to prevent cheating by truck drivers and filling station attendants.

Many dishonest motor transport drivers and filling station attendants have found ways of collecting payment from truck owners for considerably more fuel than is actually delivered to the fuel tanks of the vehicle. Recording liquid flow meters to measure and keep a record of fuel delivered have long been available, but none have been used successfully to transfer the reading from the filling station pump to an instrument on the vehicle itself because it has been discovered that the meter could be operated by blowing air through it, thus recording more fuel than actually passed through the meter. This could be done by using the compressed air supply for air brakes on the vehicle itself or by that at filling stations intended to inflate tires, although the slightest air pressure is enough to operate a meter.

The present device is located on the vehicle in the fuel supply conduit leading to the fuel tank so that any fluid which passes through the meter in sufficient quantity and pressure to operate the meter must also pass through the safety device which is provided with a float-actuated valve preventing any gaseous fluid such as air to pass through it in quantity with sufficient pressure to actuate the meter, but which will permit the free flow of liquid, such as gasoline, when in raised operating position.

The float-actuated valve is so constructed that it will vent the small quantity of air which may be entrapped in the system together with means provided to automatically correct a possible fluid lock condition, when supply source pump is momentarily shut off. In conjunction with the safety chamber containing the float-actuated valve there is also a valved by-pass located adjacent to the entering side of the meter in the fuel supply conduit which will conduct gravity-flow liquid around the meter and safety chamber directly into the fuel tank for the express purpose of preventing the introduction of high gravity liquid, such as heavy drain oil, a small quantity of which in the float-well of the float chamber would raise the float sufficiently to hold the outlet valve open and permit air to be blown through the fuel conduit to create false meter readings.

Figures 3, 5, 6:
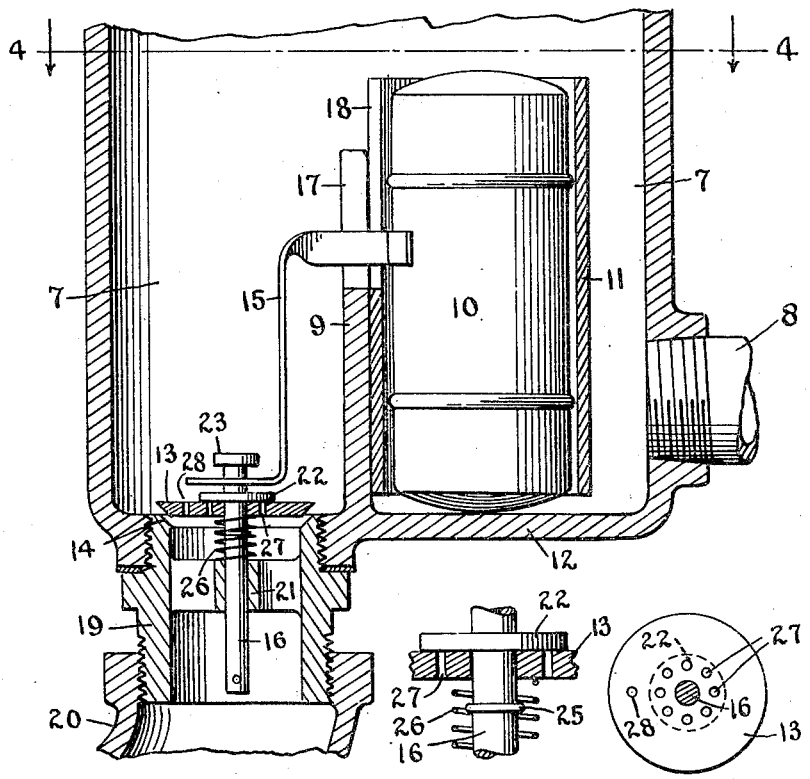
Figure 4:
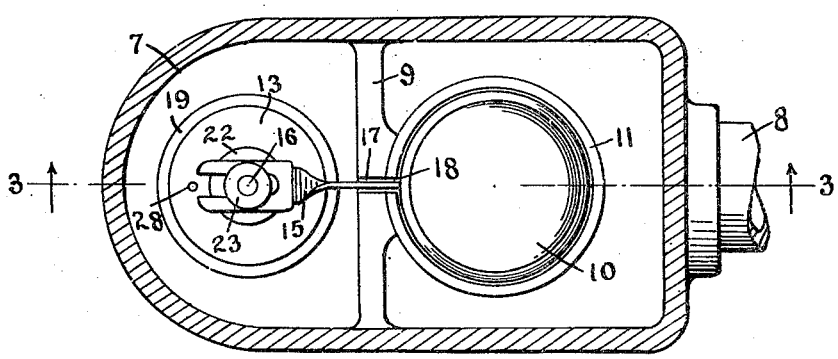

The invention provides various features of construction and arrangement, hereafter more fully described, reference being had to the accompanying drawings in which, Fig. 1 is an elevation, partly in section, of the meter and air flow check device in operative arrangement, Fig. 2 is an enlarged section of the valved portion of the fluid by-pass, Fig. 3 is an enlarged fragmentary vertical section of the float-actuated valve and chamber on the line 3—3 of Fig. 4, Fig. 4 is a sectional plan view of the float-actuated valve and chamber on the line 4—4 of Fig. 3, Fig. 5 is a plan view of the float-actuated valve, and Fig. 6 is an enlarged fragmentary detail showing the connection between the float-actuated valve and its stem.

Like reference numbers apply to like parts in all of the figures.

1 is the liquid flow meter which may be of conventional type which measures and records the liquid passing through it. For best operation the meter should require liquid to be under moderate pressure to pass through it.

2 is the inlet pipe through which all fluid entering the system passes. The entrance end of the pipe is provided with a special-rubber pressure-seal socket 3, tapered to receive a range of supply-pump nozzle sizes, into which the supply source nozzle may be tightly inserted to prevent leakage and retain pressure. The pipe 2 communicates with the meter through the fitting 4, valved passage 5, and the valve 6, of which more will be hereafter explained.

The outlet of the meter 1 communicates with the float chamber 7 through a nipple 8 which enters the chamber near its bottom and on the side of the weir 9 at which the float is located. The float 10 is mounted for vertical movement in a cylindrical guide 11, open at both top and bottom and has its lower end spaced upwardly from the bottom 12 of the chamber 7. The weir 9 extends upwardly from the chamber bottom 12 and serves to direct entering liquid and float 10 to a buoyancy level sufficient to maintain float-actuated valve 13 in full raised position from its seat 14, under full flow pressure, for the free passage of liquid therethrough.

An arm 15 has its upper end attached to the float 10 and its lower end is forked and straddles the valve stem 16. The arm 15 passes through vertical slots 17 and 18 in the weir 9 and guide 11. It is vertically movable therein, the slots 17 and 18 being relatively narrow so that liquid which will flow through the slots will not be of such quantity as to interfere with operation of the float. These slots also serve as a drain passage to initial buoyancy level as hereafter described.

The float-actuated valve 13 acts to open or close the outlet passage from the float chamber 7, which passage leads through conduits 19 and 20 to the fuel tank of the vehicle on which the apparatus is mounted. Such fuel tanks are customarily provided with air-vents of siphon-proof nature to exhaust displaced-air in addition to those provided to prevent the creation of a vacuum as fuel is drawn from the tank and used.

The valve stem 16 slides in the guide 21 and the valve 13 is loosely mounted on said valve stem. A disc 22 is an integral part of valve stem 16 as is the stem-head 23 which is spaced upwardly from the disc 22. The forked lower end of the arm 15 straddles the stem 16 between the disc 22 and the stem-head 23 and has limited vertical movement between them. A lock-ring 25 surrounds the stem 16 a short distance below the valve 13 and limits the upward movement of disc 22 above the surface of valve 13, for correction of a possible fluid-lock condition by exposing the plurality of ports 27 in valve 13, said lock-ring 25 also serves to lift the valve 13 to full open position, which travel is limited by the contact of float 10 with the cover of float chamber 7.

A spring 26 seated on guide 21 holds valve 13 a short distance above valve seat 14 in an "at rest position", free of pressure" the tension of said spring 26 is adjusted to hold the weight of the valve assembly and resist pressure just short of the critical air-pressure required to actuate the meter.

The valve 13 has a plurality of ports 27 within the area of and closed by the disc 22 in the "at rest position" as shown in Fig. 3. A constantly open small port 28 passes through the valve 13 outside the area of the disc 22.

The valve by-pass branches from the fitting 4 and is comprised of a series of fittings 30, 31, 32, and 33, which with connection 34 form a conduit communicating with conduit member 20 which leads to the fuel tank. At the entrance to this branched by-pass the fitting 30 has a valve seat 35 and a valve 36 which opens in the direction of the incoming fluid entering the meter. The valve stem 37 slides in a guide 38 and a spring 39 holds the valve 36 open above its seat 35. The spring 39 has sufficient tension to hold the valve 36 at its open limit and resist moderate closing pressure.

The valve 6 has a seat 6a in the passage member 5. The valve stem 40 slides in a guide 41 and the valve 6 opens in the direction of fluid flow toward the meter 1. The valve 6 is held closed by a spring 42 which is somewhat stronger than the spring 39 and will hold the valve closed under pressure sufficient to close the valve 36 but which will yield under normal supply-pump fluid pressure to open said valve 6. Normal fluid pressure is intended to mean that under which fuel is fed into the system from a filling station pump and is on the order of 15 lbs. per square inch.

Operation

The various valves in the system are shown positioned as in Fig. 2 and Fig. 3 of the attached drawings prior to the start of the fill operation. A siphon-proof displaced-air vent must be provided on the fuel tank, to which subject apparatus is connected, as system is completely tight and the mentioned vent must be opened prior to starting the fill operation.

The nozzle of the supply hose is tightly inserted into the pressure-seal socket 3 of Fig. 1 and the initial 2/10 of a gallon is pumped at a relatively slow rate, so as not to exceed the capacity of the valve 13 and its supporting spring 26 to exhaust entrapped air ahead of the incoming liquid, until the buoyancy level of the float 10 is reached, at the bottom of the slots 17 and 18 of the weir 9 and the float guide 11 on the float side of weir 9 in the chamber 7, by said incoming liquid, after which the fill may be continued at full pump capacity as the outlet valve 13 is lifted to full open position by float 10 which comes to rest in contact with the cover of chamber 7, where it remains till fill is completed after which it resumes original position of rest on bottom of chamber 7 as shown in Fig. 3 of the drawing.

Detailed progress of liquid during the fill operation is as follows: after tightly inserting supply hose nozzle in socket 3 the flow of liquid fuel under pressure is commenced. Upon entering the fitting 4, the pressure of the pumped liquid will immediately close the valve 36 so that the liquid will not flow through the by-pass around the meter 1. Upon reaching the valve 6, the pressure will open this valve and the liquid will flow through the meter 1 causing it to operate to measure and record the volume of liquid passing through it.

Upon entering the float chamber 7, the liquid will force the air therein out through the valve 13. If the initial flow of the liquid is relatively slow, the air pressure in the float chamber will not rise high enough to close the valve 13 against tension of the spring 26 and the air will flow out through the partially open valve while the level of liquid rises around the float 10 and flows over the top of the weir 9.

By this time, the float has risen to fully open the valve 13. This is accomplished by the forked lower end of the arm 15 lifting against the stem-head 23 thereby raising the valve stem 16, the lock-ring 25 of which engages and lifts the valve 13 to open position and thereafter liquid flows freely under pump pressure through the system and its volume is measured and recorded by the meter.

If the initial flow of liquid into the float chamber 7 is too fast, before it reaches the buoyancy-level at the bottom of slots 17 and 18 from which level the float 10 rises to lift valve 13 open, for the air entrapped therein to escape through the partially opened valve 13 the air pressure will close the valve and increase as it is compressed by the incoming liquid which will spill over weir 9 and cover valve 13 and rise to a level completely immersing the float 10 before back-pressure equalizes with the input-pressure of the supply pump. The average station pump is set to cut off at 20 lbs. pressure.

The weight of liquid and pressure above and on the valve 13 area under this condition is too great for the buoyancy of the float to overcome when the pump is shut off and a fluid lock condition prevails. However, the float will raise the smaller area of disc 22 when pump pressure is shut off exposing the plurality of drain ports 27 in valve 13, to speedily correct the locked condition. The permanently open vent passage 28 through valve 13 acts as a pressure release and provides access to the atmosphere through tank air vents to break the vacuum in chamber 7 caused by the drainage of liquid therefrom. The valve 13 is raised to open position to complete the correction of the locked condition as full float buoyancy is re-established.

If it is attempted to flow air through the system in an effort to actuate the meter and create a false reading thereon, this is prevented as follows: The pressure and volume of entering air required to close by-pass valve 36 and open valve 6 is far greater than that required to operate the meter 1 and exceeds the capacity of the small vent 28 in the outlet valve 13 and will therefore close said valve 13 against the supporting tension of the spring 26 which is adjusted to permit valve 13 to close before the minimum critical pressure required to actuate the meter 1 is reached. The closure of valve 13 locks the meter at once due to the instantaneous equalization of air pressure which neutralizes the flow of air within the system. The liquid on the float side of weir 9 is not higher than the bottom of the slots 17 and 18 of the weir 9 and the guide 11 at, but not above, the buoyancy-level of the float 10 after a fill and consequently the float will not rise to lift valve 13.

The valved by-pass was incorporated in the system specifically to prevent the introduction, by gravity-flow, of high gravity liquid, such as motor oil, a small quantity of which, poured into the entrance passage and through the meter into the float side of the chamber 7, is sufficient to buoy the float high enough to hold the valve 13 open and so permit air to be freely blown through the meter to cause the false register thereof. The strongly seated valve 6 directs gravity-flow into the by-pass through the open valve 36, and around the meter and chamber 7 directly into the fuel tank. Gravity-flow will not open valve 6 nor will it close valve 36.

This device has been used commercially and has been found to prevent dishonest operation of the fuel meter while providing a means to reconcile fuel receipts within the limits of practical accuracy.

I claim:

1. The combination with a conduit having a liquid flow meter therein of an air flow check device in said conduit comprising, a casing having an inlet chamber, an outlet chamber, an inlet passage into said inlet chamber and an outlet passage from said outlet chamber, each passage being in communication with said conduit, a weir within said casing and separating said chambers, a float in said inlet chamber, a valve in said outlet passage, easily yieldable means for holding said valve only slightly open, and connecting means between said float and said valve acting to fully open said valve by buoyant movement of the float.

2. The elements of claim 1 in which said connecting means has a slack movement acting to permit limited movement of said valve without movement of the float.

3. The elements of claim 1 in which said valve has a movable stem with which said connecting means is connected said valve being movably mounted on said stem, said easily yieldable means being a light tension spring acting to hold said valve partly open, a disc on said stem against which said valve is thrust by said spring, and said valve having a passage therethrough within the area of said disc and normally closed thereby.

4. The elemnets of claim 3 in which said valve has a second constantly open restricted passage therethrough outside the area of said disc.

5. The elements of claim 3 in which said disc has considerably less area than the area of the valve.

6. The elements of claim 4 in which said connecting means has a slack movement acting to permit limited movement of said valve and stem without movement of said float.

7. The combination with a conduit having a liquid flow meter therein of an air flow check device in said conduit comprising, a casing having an inlet chamber and an outlet chamber separated by a weir, an inlet passage into said inlet chamber and an outlet passage from said outlet chamber, each passage being in communication with said conduit, a float in said inlet chamber, a first valve in said outlet passage, means actuated by a surge of air current acting to close said first valve, a connection between said first valve and said float acting to open the valve by buoyant movement of the float, a by-pass passage leading around said meter and said first valve, a by-pass valve in said passage exposed to fluid therein, and easily yieldable means for holding said by-pass valve open, said yieldable means yielding to permit the by-pass valve to close when subjected to appreciable pressure.

8. The elements of claim 7 combined with a second valve in said conduit beyond said by-pass valve in the direction of said meter, and yieldable means acting to hold said second valve closed, said yieldable means being of tension to yield to permit said second valve to open when subjected to the normal pressure of fluid in said conduit.

9. The elements of claim 7 combined with easily yieldable means for holding said first valve partially open and a slack movement connection between the float and first valve acting to permit limited movement of said first valve without movement of said float.

References Cited in the file of this patent
UNITED STATES PATENTS

| | | |
|---|---|---|
| 1,575,782 | Mowry | Mar. 9, 1926 |
| 2,006,135 | Gibbs | June 25, 1935 |
| 2,174,424 | Nall | Sept. 26, 1939 |
| 2,205,761 | Hallberg | June 25, 1940 |
| 2,697,943 | Pressler | Dec. 28, 1954 |